(12) United States Patent
Kukulski et al.

(10) Patent No.: US 9,290,189 B2
(45) Date of Patent: Mar. 22, 2016

(54) COUPLER ASSEMBLY FOR COUPLING RAILWAY WAGONS

(75) Inventors: Jan Kukulski, Kosina (PL); Leszek Wasilewski, Gniewczyna (PL); Jan Kochmanski, Sietesz (PL); Marian Andres, Zarzecze (PL); Miroslaw Sum, Przeworsk (PL); Grzegorz Winiarz, Rzeszow (PL)

(73) Assignee: AXTONE SPOLKA AKCYJNA, Kanczuga (PL)

( * ) Notice: Subject to any disclaimer, the term of this patent is extended or adjusted under 35 U.S.C. 154(b) by 246 days.

(21) Appl. No.: 13/885,427

(22) PCT Filed: Jul. 21, 2011

(86) PCT No.: PCT/PL2011/000080
§ 371 (c)(1),
(2), (4) Date: Jun. 20, 2013

(87) PCT Pub. No.: WO2012/067526
PCT Pub. Date: May 24, 2012

(65) Prior Publication Data
US 2013/0270210 A1    Oct. 17, 2013

(30) Foreign Application Priority Data
Nov. 16, 2010 (PL) .......................... 392966

(51) Int. Cl.
*B61G 9/10* (2006.01)
*B61G 9/18* (2006.01)
(Continued)

(52) U.S. Cl.
CPC .. *B61G 9/10* (2013.01); *B61G 9/18* (2013.01); *B61G 11/16* (2013.01); *F16F 7/127* (2013.01)

(58) Field of Classification Search
CPC ............ B61G 9/10; B61G 9/18; B61G 11/16; F16F 7/127
USPC .............................. 213/7, 62 R; 188/375, 376
See application file for complete search history.

(56) References Cited

U.S. PATENT DOCUMENTS

| 1,943,676 | A | * | 1/1934 | Kadel ............................... 213/7 |
| 3,779,591 | A |   | 12/1973 | Rands ............................... 293/89 |
| 4,346,795 | A |   | 8/1982 | Herbert .......................... 188/375 |
| 6,360,906 | B1 |  | 3/2002 | Kaufhold et al. ............... 213/75 |

(Continued)

FOREIGN PATENT DOCUMENTS

| EP | 1 431 157 A1 | 6/2004 | ............... B61G 9/12 |
| WO | WO 98/39193 | 6/1998 | ............... B61F 1/10 |

OTHER PUBLICATIONS

International Search Report mailed Nov. 29, 2011 (in corresponding application No. PCT/PL2011/000080).

(Continued)

*Primary Examiner* — Zachary Kuhfuss
(74) *Attorney, Agent, or Firm* — Renner Kenner Greive Bobak Taylor & Weber

(57) ABSTRACT

The coupler assembly for coupling railway wagons comprises a pulling apparatus (10) positioned between a front stop (6) and a rear stop (7) in space between central girders (1, 2) of a railway carriage. The front stop (6) is fixed rigidly to the central girders (1, 2) of the wagon frame. The solution is characterized by the fact that the rear stop (7) is mounted in a moving manner between the central girders (1, 2) of the wagon frame, and a support bracket (9), fixed permanently to the wagon frame, is positioned behind the rear stop (7), whereby an increased energy absorption unit (12) is positioned between the support bracket (9) and the rear stop (7).

17 Claims, 12 Drawing Sheets

(51) Int. Cl.
*B61G 11/16* (2006.01)
*F16F 7/12* (2006.01)

(56) References Cited

U.S. PATENT DOCUMENTS

| | | | |
|---|---|---|---|
| 7,484,781 B1 | 2/2009 | Garber et al. | 293/133 |
| 2009/0151595 A1 | 6/2009 | Kontetzki | 105/8.1 |
| 2013/0048455 A1* | 2/2013 | Friedrich et al. | 188/377 |

OTHER PUBLICATIONS

Written Opinion mailed Nov. 29, 2011 (in corresponding application No. PCT/PL2011/000080).
Written Opinion mailed Oct. 31, 2012 (in corresponding application No. PCT/PL2011/000080).
International Preliminary Report on Patentability mailed Feb. 11, 2013 in corresponding application No. PCT/PL2011/000080.

* cited by examiner

COUPLER ASSEMBLY FOR COUPLING RAILWAY WAGONS

CROSS-REFERENCE TO RELATED APPLICATION

This is a §371 application of International patent application number PCT/PL2011/000080 filed Jul. 21, 2011, which claims the benefit of Polish patent application number P.392966 filed on Nov. 16, 2010, and which is incorporated herein by reference.

TECHNICAL FIELD

The subject of the invention is a coupler assembly for coupling railway wagons. In particular, the invention concerns the construction of the main coupler assembly suitable for transferring increased longitudinal compressive forces which arise mainly in the case of coupling wagons with speeds in excess of permissible ones and in extraordinary situations such as collisions of railway wagons.

BACKGROUND ART

From the description of patent application WO9839193 a coupler assembly used in the underframe of railway wagons is known. The known solution has two central longitudinal girders positioned on both sides of the wagon's roll axis. The coupler assembly, intended to transfer longitudinal tensile and compressive forces, contains a pulling apparatus located between the rear and front stop in the space between the central girders of the wagon's frame. In such a solution it is also possible to use additional shock absorbing elements, intended to equalise the tractive force and to dampen the braking energy. Due to construction reasons such additional shock absorbing elements may be positioned between the rear stop and the front stop and, in particular: between the front stop and the pulling apparatus, in the pulling apparatus itself or between the rear stop and the pulling apparatus.

From the description of patent EP1431157 an underframe for railway wagons is also known, in which, in order to increase the ability to dampen the energy created by the occurrence of increased compressive forces, an additional shock absorbing head, fixed separately under the central girders of the wagon frame, is used in the coupler assembly.

U.S. Pat. No. 4,345,795 discloses a coupler assembly for coupling railway wagons with a pulling apparatus designated to absorb energy. The coupler assembly comprises a mechanical coupler to be connected to one railway wagon and a coupler support mechanism to be coupled to another wagon. The coupler assembly also includes a cutting ring situated between two tubes movable relative to each other.

US2009/0151595 discloses an energy dissipation device for coupling railway wagons having a damping unit and an increased energy absorption unit used for responding after critical impact force and converting at least a part of impact energy into heat and plastic deformation work.

SUMMARY OF THE INVENTION

The purpose of the solution according to the invention is the development of a coupler assembly for coupling railway wagons which, while having a small mass and a simple construction, would be capable of dampening and absorbing large amounts of energy occurring in the underframes of railway wagons, especially during coupling with speeds in excess of permissible ones, and in extraordinary situations such as collisions of railway wagons, while ensuring proper shock absorption of variable tensile and compressive forces occurring during normal use. Additionally the coupler assembly should have an increased resistance to lateral forces that occur during extreme braking caused by collisions.

The coupler assembly for coupling railway wagons has a pulling apparatus positioned between a front stop and a rear stop in space between central girders of a wagon frame, whereby the front stop is rigidly fixed to the central girders of the wagon frame, the coupler assembly having an energy absorbing unit positioned in the pulling apparatus. The solution is characterized by that the rear stop is mounted in a moving manner between the central girders of the wagon frame, and a support bracket, permanently fixed to the wagon frame, is located behind the rear stop, whereby an increased energy absorption unit is located in the space limited by the central girders, the support bracket and the rear stop, wherein the increased energy absorption unit comprises a bar fixed permanently to the rear stop and mounted in a moving manner in the guiding aperture made in the front wall of the support bracket, whereby machining knives are fixed on the circumference of a guiding aperture.

Preferably, the support bracket has side walls and a front wall, perpendicular to the side walls, having an increased thickness, and it is fixed permanently to the central girders of the wagon frame.

Preferably, the support bracket is fixed permanently to the central girders via a riveted connection.

Preferably, the support bracket fixed permanently to the central girders via a screw connection.

In another preferred embodiment the support bracket is fixed permanently to the central girders via a welded connection.

In a preferred embodiment the machining knives are cutting blades located in guiding grooves of a limited length made in the surface of the bar.

In another preferred embodiment shank parts of the machining knives are fixed in radial cut-outs made in the front wall of the support bracket.

In a more preferred embodiment the bar has the form of a sleeve.

In a preferred embodiment the bar is secured against displacement in the guiding aperture up to a specific limit force.

Preferably, the securing of the bar against displacement in the guiding aperture is achieved by a shear sleeve, one part of which is connected to the support bracket and the other part with the bar.

Preferably, the securing of the bar against displacement in the guiding aperture is achieved by at least one shear pin embedded in the support bracket and in the bar.

In another preferred embodiment the securing of the bar against displacement in the guiding aperture is achieved by a resistance protrusion positioned on the bar in front of the cutting blade of the machining knife.

The realisation of the rear stop in a movable form with respect to the central girders and fixing of the support bracket to the wagon frame at a distance from the rear stop ensures the use of the rear stop as leading element of the bar between the central girders and thereby improves leading of the bar especially while acting lateral forces that occur during extreme braking caused by collisions. Additionally, fixing the bar to the rear stop and its mounting in a moving manner in the guiding aperture with machining knives in the front wall of the support bracket facilitates the use of this guiding aperture also as a guideway for the displaceable rear stop.

BRIEF DESCRIPTION OF THE DRAWINGS

The subject of the invention is illustrated in examples of its embodiments in the drawing, in which FIG. 1 shows the coupler assembly according to the invention located on the undercarriage of the railway vehicle in a perspective view, FIG. 2 the assembly shown in FIG. 1 in a top view, FIG. 3 the coupler assembly in a perspective view, FIG. 4 the coupler assembly in a top view, FIG. 5 the rear stop fixed to the support bracket in a perspective view, FIG. 6 the rear stop fixed to the support bracket in a longitudinal section, FIG. 7 the construction of the support bracket in a perspective view without the screwed on machining knives and without the machined sleeve, FIG. 8 a detail of the solution intended to determine the limit force for releasing the rear stop, FIG. 9 another solution intended for determining the limit force for releasing the rear stop, FIG. 10 a consecutive example of determining the limit force for releasing the rear stop, FIG. 11 the coupler assembly according to the invention without the front stop in a perspective view, FIG. 12 the coupler assembly according to the drawing without the front stop after total deformation in a perspective view, FIG. 13 part of the coupler assembly according to the invention during deformation in a perspective view, FIG. 14 partial longitudinal section through the support bracket during deformation, FIG. 15 rear stop displaced in relation to the support bracket after total deformation in a longitudinal view, while

BEST MODE FOR CARRYING OUT THE INVENTION

Figure 1:
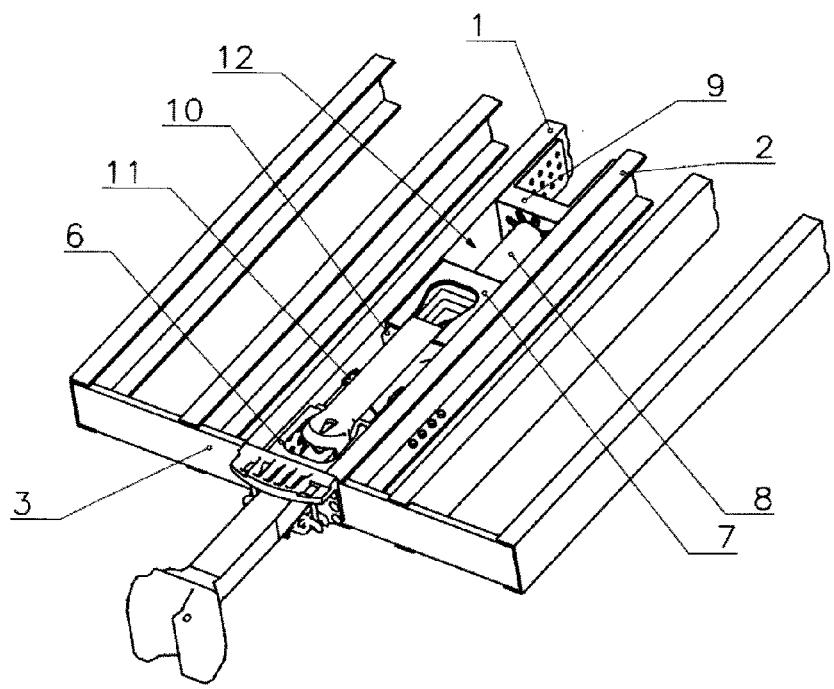
Figure 2:
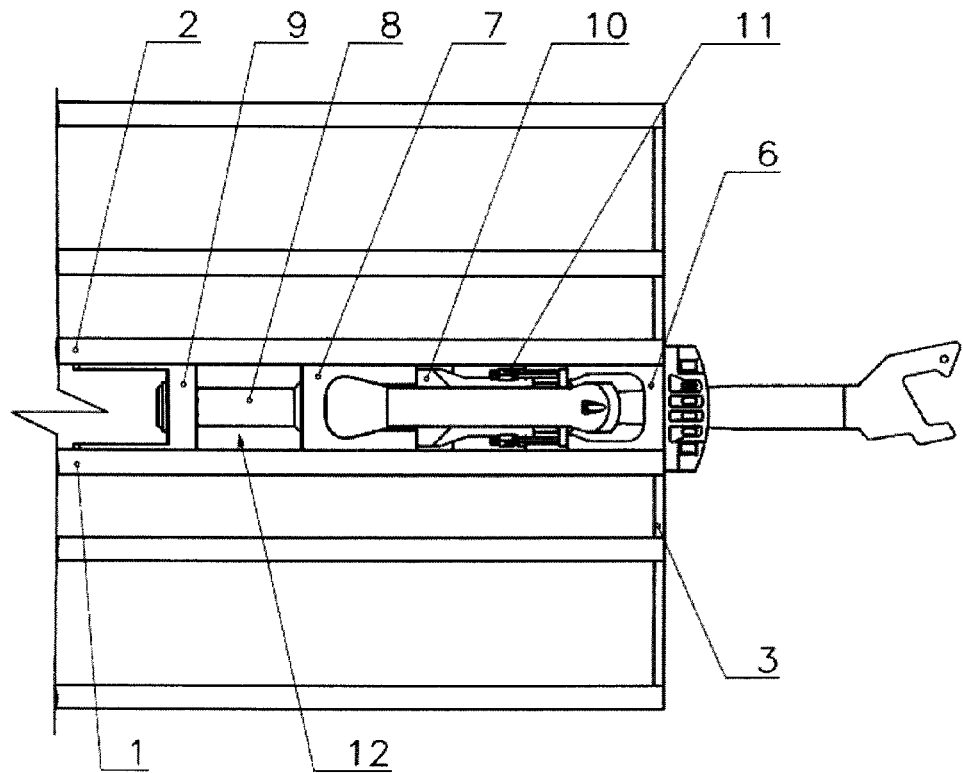

FIG. 1 and FIG. 2 show the location of the coupler assembly according to the invention in the underframe of a railway wagon. The shown underframe of the railway wagon has central girders 1, 2 running on both sides of the longitudinal axis of the railway wagon, connected to a front girder 3. A front stop 6 is rigidly fixed between the central girders 1, 2, while the rear stop 7 is mounted loosely between said girders and rigidly fixed via a bar 8 with a support bracket 9 which is permanently fixed to the frame of the wagon by riveting, fixing with screws or welding to the inside surfaces of the central girders 1, 2. The coupler assembly according to the invention positioned in the underframe of a railway wagon has a pulling apparatus 10 positioned between the front stop 6 and the rear stop 7, in which an absorbing unit 11, which absorbs energy, is mounted, the purpose of which is to equalise the variable tensile and compressive forces which occur during normal use. The space between the rear stop 7 and the support bracket 9 is intended for mounting an increased energy absorption unit 12 shown in more detail in FIG. 3 and FIG. 4 which show the coupler assembly according to the invention in a perspective view and top view.

Figure 3:
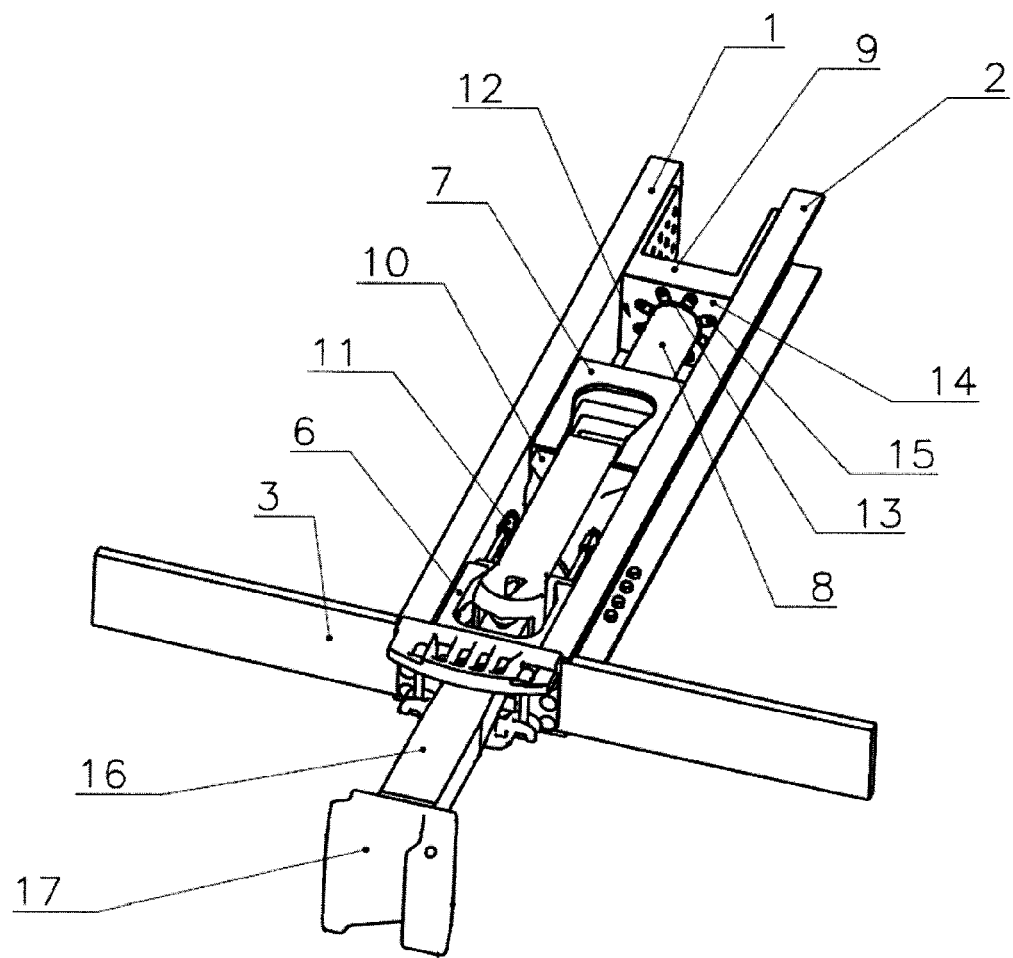
Figure 4:
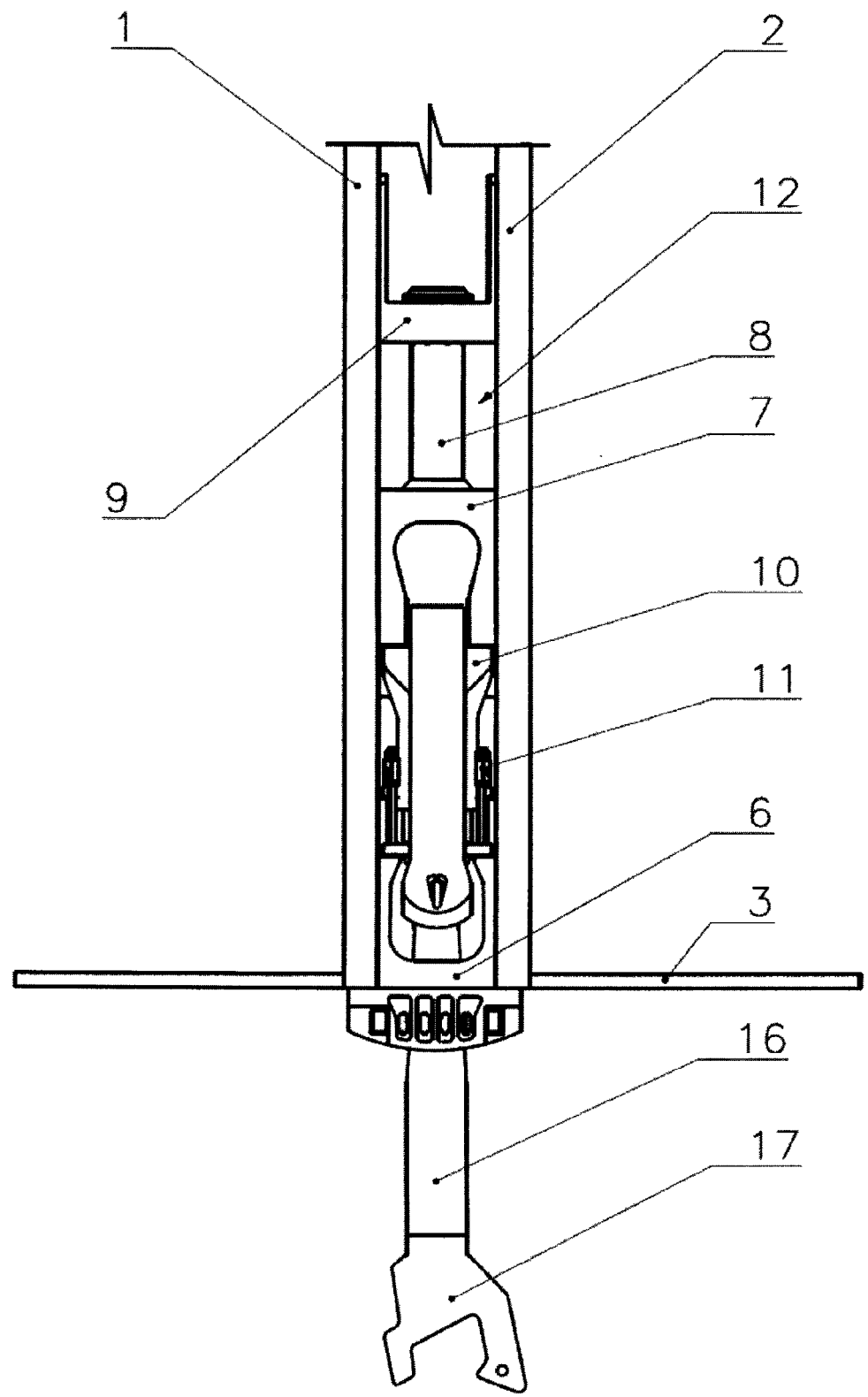

In the solution of the embodiment illustrated in FIG. 3 and FIG. 4, the increased energy absorption unit 12 constitutes the bar 8 permanently fixed to the rear stop 7 and positioned with a possibility of displacement in a guiding aperture 13 made in a front wall 14 of the support bracket 9. The possibility of absorbing increased energy is achieved in this embodiment by mounting machining knives 15 on the circumference of a guiding aperture 13 and introducing the blades of machining knives 15 into the external surface of the bar 8. A tractive force and a breaking force are transferred to a pulling apparatus 10 positioned between the front stop 6 and the rear stop 7, via a bar 16 connected with the coupling girder 17.

Figure 5:
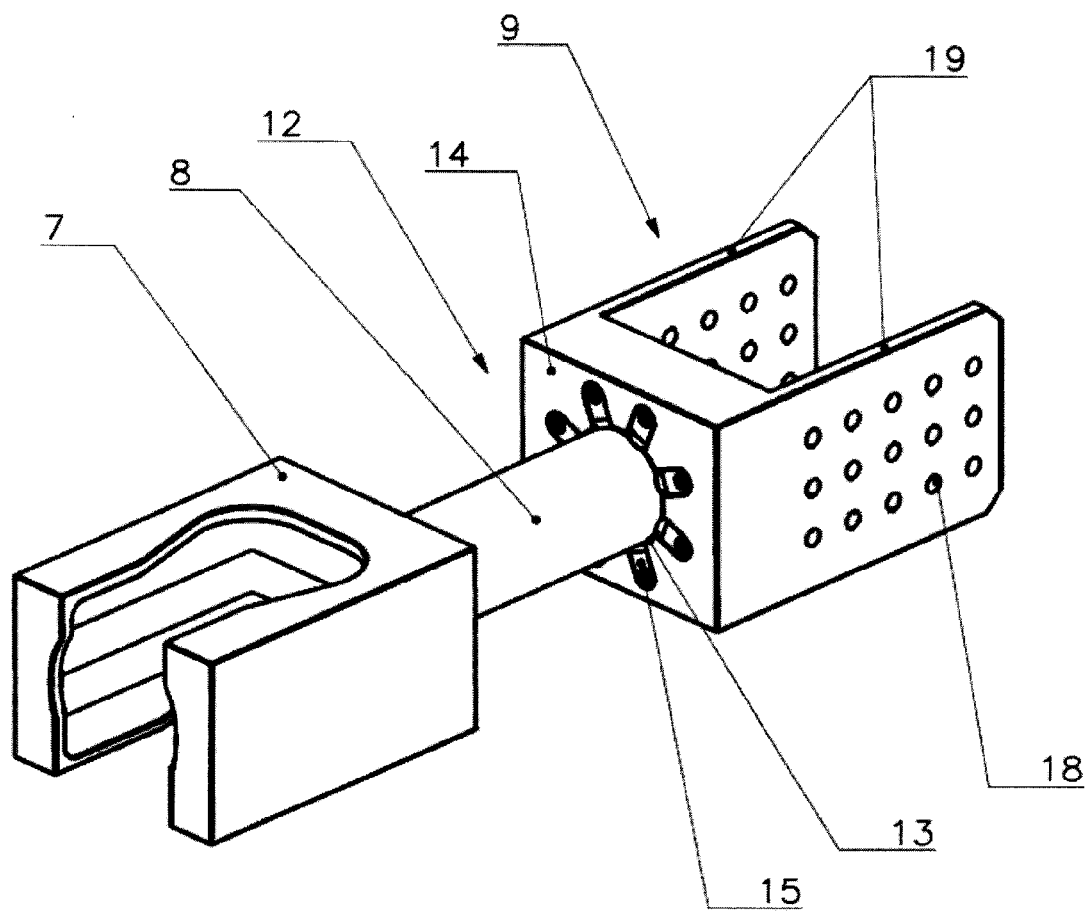
Figure 6:
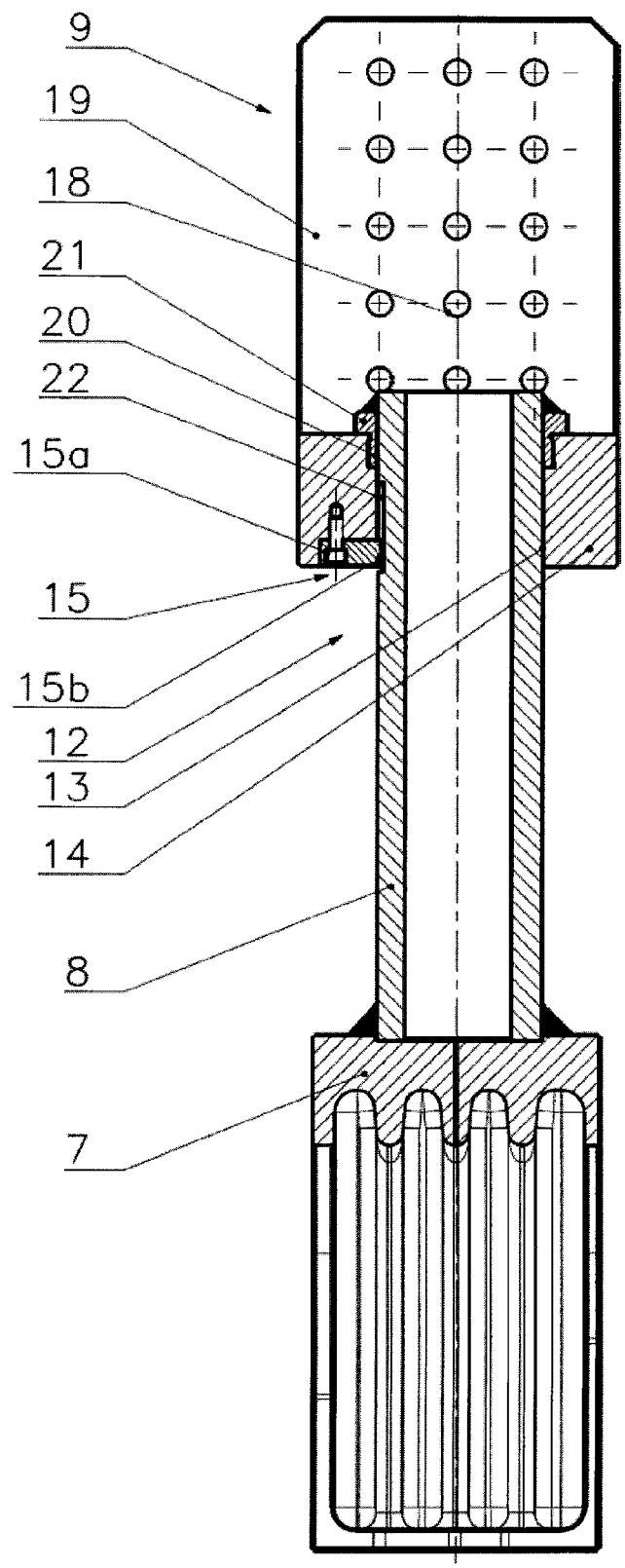

FIG. 5 and FIG. 6 present the increased energy absorption unit 12 in the form of the bar 8 permanently fixed to the rear stop 7 and positioned with a possibility of displacement in the guiding aperture 13 made in the front wall 14 of the support bracket 9. Apertures 18 made in side walls 19 of the support bracket 9 are intended for executing a riveted or screw connection of the support bracket 9 with the central girders 1, 2 of the railway wagon frame.

In the longitudinal section presented in FIG. 6 the bar 8 has the form of a pipe, one end of which is welded to the rear stop 7. The other end of the pipe bar 8 is positioned with a possibility of displacement in the guiding aperture 13 in the support bracket 9, whereby the bar 8 is secured against free displacement in said aperture by a threaded sleeve 20 with a flange 21 welded to the end of the bar 8 protruding from the front wall 14. Shank parts 15a of the machining knives 15 are fixed at the entrance to the guiding aperture 13, whereby cutting blades 15b of those knives are positioned in guiding grooves 22 of a limited length, made on the surface of the bar 8.

Figure 7:
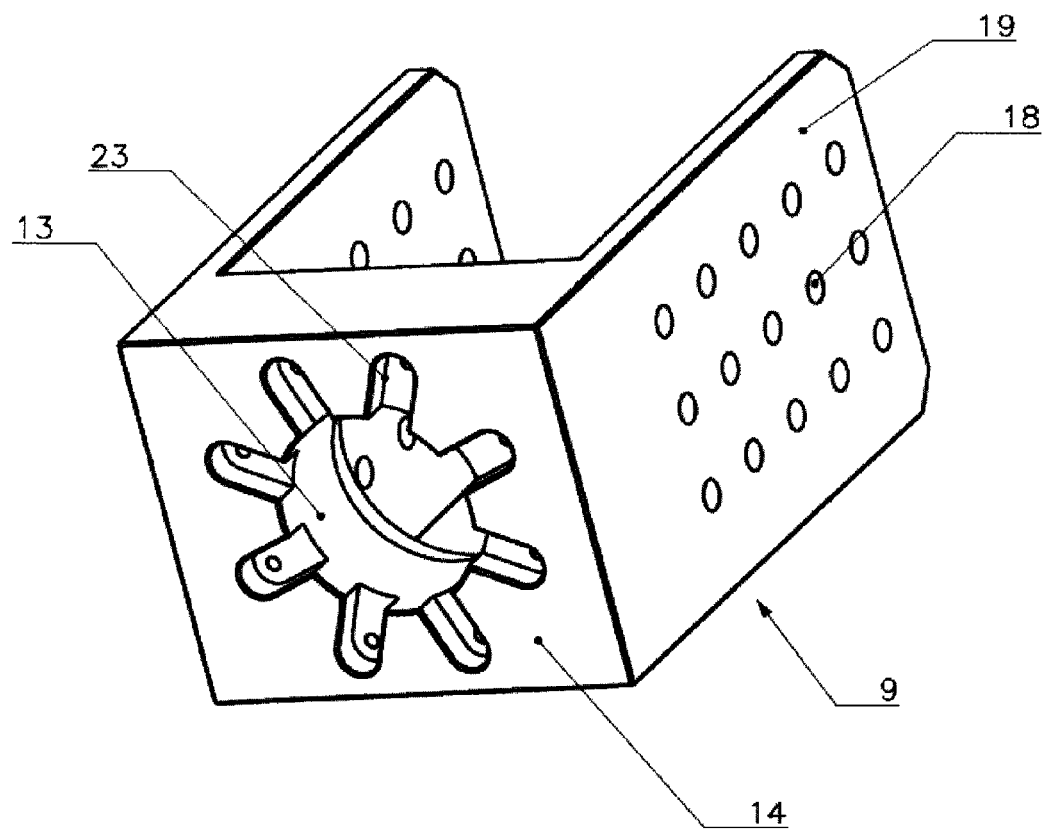

In order to ensure an equal distribution of forces facilitating the easier axial guiding of the bar 8 in the guiding aperture 13 during the operation of the coupler assembly, the shank parts 15a of the machining knives 15 are fixed in radial cut-outs 23 at different angular distances. The shape and distribution of the radial cut-outs 23 are shown in FIG. 7 in which the support bracket 9 is shown in a perspective view prior to the affixing by screws of the machining knives 15 and prior to its mounting in the construction of the coupler assembly according to the invention. As shown in FIG. 7, the support bracket 9 has the side walls 19 perpendicular to the front wall 14 of an increased thickness.

Figure 8:
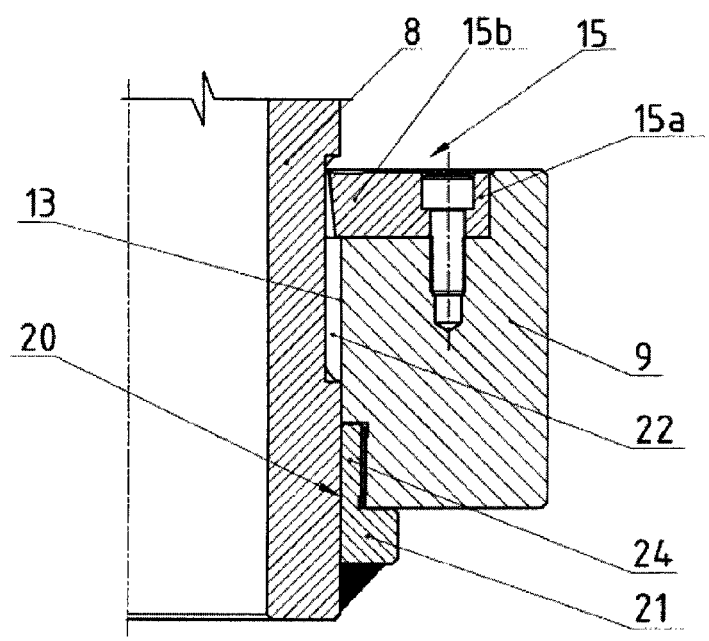

FIG. 8 shows the details of the solution intended for determining the limit force for freeing the displacement of the bar 8, and through this also the displacement of the rear stop 7. The end of the pipe bar 8 is positioned with a possibility of displacement in the guiding aperture 13 in the support bracket 9, whereby the bar 8 is secured against free displacement in said aperture by the shear sleeve 20, a threaded part 24 of which is screwed into the support bracket 9, and the other part, comprising the flange 21 is welded to the bar 8. The shank parts 15a of the machining knives 15 are fixed at the entrance to the guiding aperture 15, whereby the cutting edges 15b of those knives are positioned in the guiding grooves 22 made in the bar 8.

Figure 9:
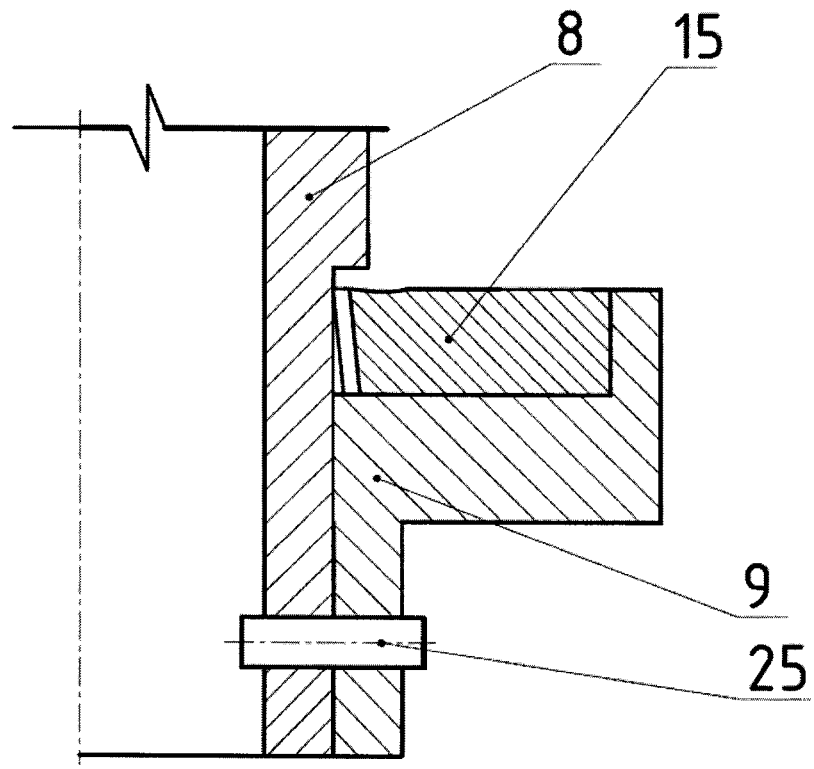

FIG. 9 shows the details of an alternative solution intended for determining the limit force for freeing the displacement of the bar 8. In the presented solution the limit for freeing the bar 8 is determined by the force of shearing of the pins 25 which pass through the wall of the support bracket 9 and through the wall of the sleeve bar 8.

Figure 10:
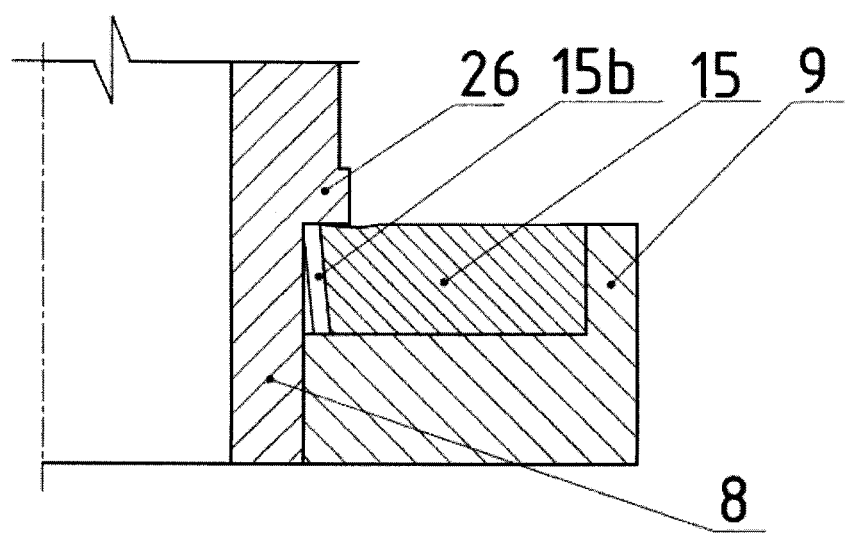

In another solution shown in FIG. 10, the limit force of the freeing of the displacement of the bar 8 in relation to the support bracket 9 is determined by the resistance protrusions 26 located on the bar 8. The resistance protrusions 26 can take on the form of "spot" increased thickness of the material of the bar 8 located in front of the cutting edge 15b of the machining knife 15, or they may be executed in the form of a ring of increased thickness along the whole circumference of that bar in the vicinity of the cutting edge 15b.

Figure 11:
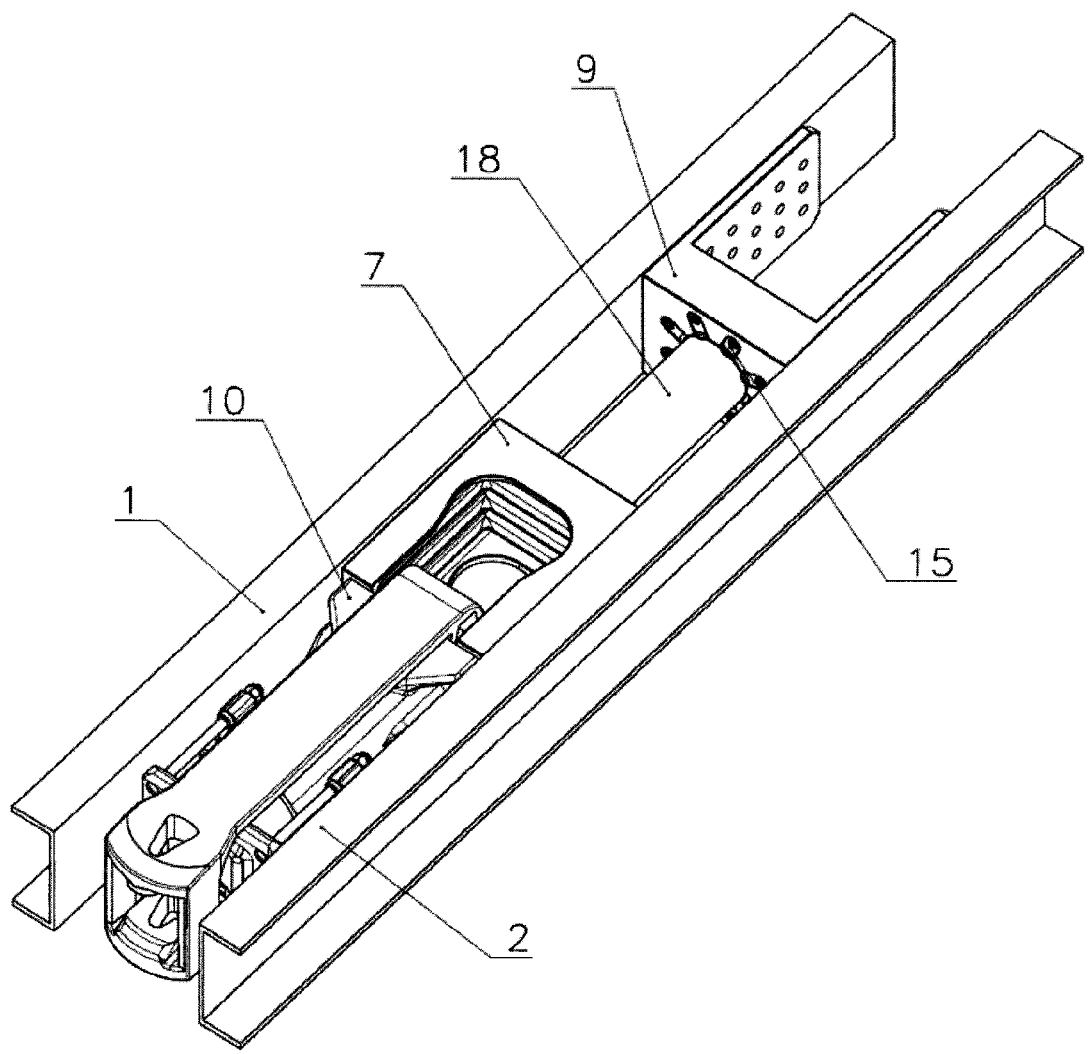
Figure 12:
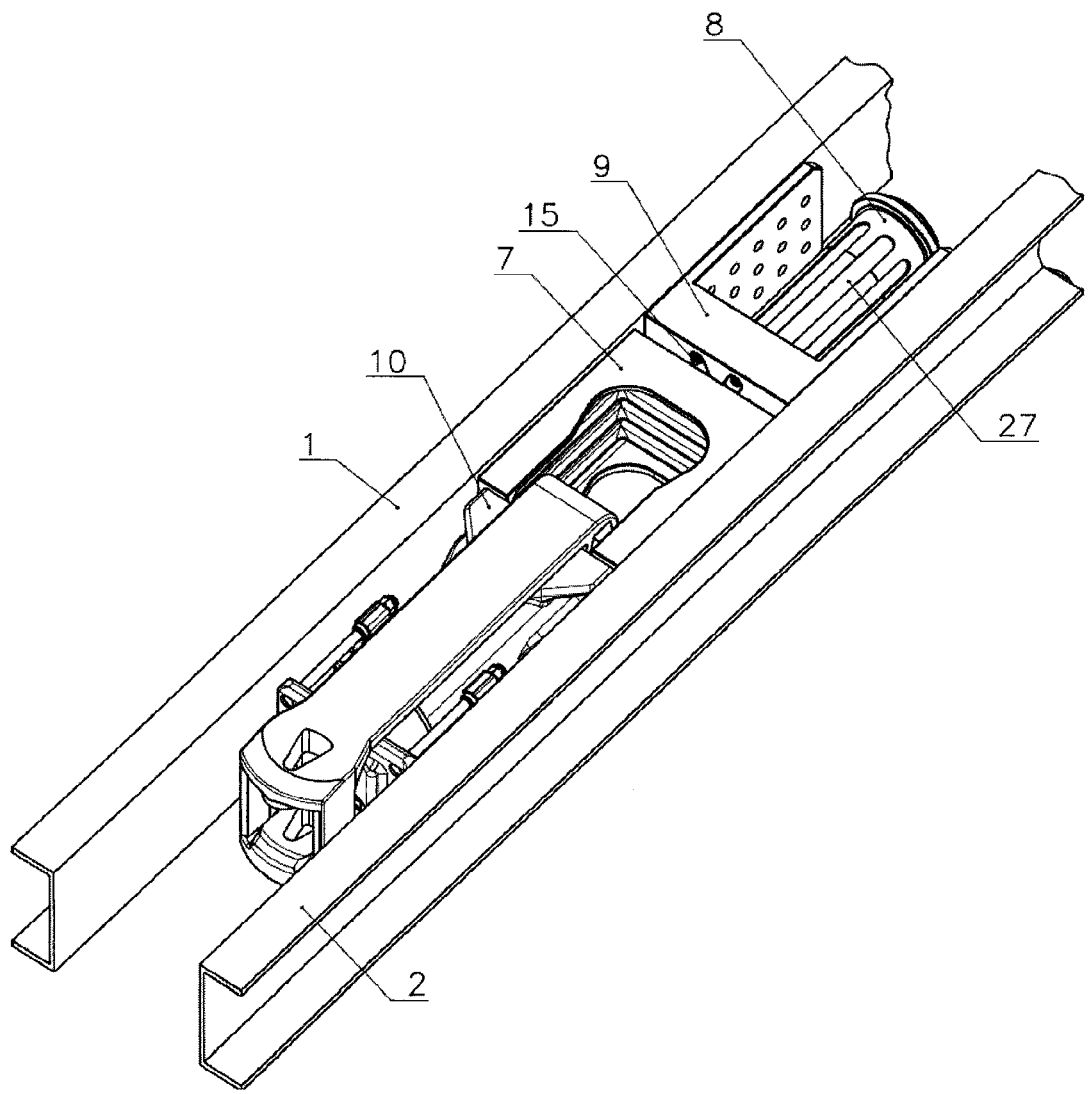

FIG. 11 shows a coupler assembly according to the invention in the perspective view without the front stop, while FIG. 12 shows the same coupler assembly after total deformation caused as a result of a collision of railway wagons. As shown in FIG. 12, during a collision the pulling apparatus 10 located between the central girders 1, 2 is displaced, and together with it the bar 8 fixed to the rear stop 7 mounted in a moving manner in relation to said central girders 1, 2 takes place, thus causing that the machining knives 15 positioned on the support bracket 9 perform the operation of cutting longitudinal grooves 27 on the surface of the bar 8, absorbing the kinetic energy of the collision.

Figure 13:
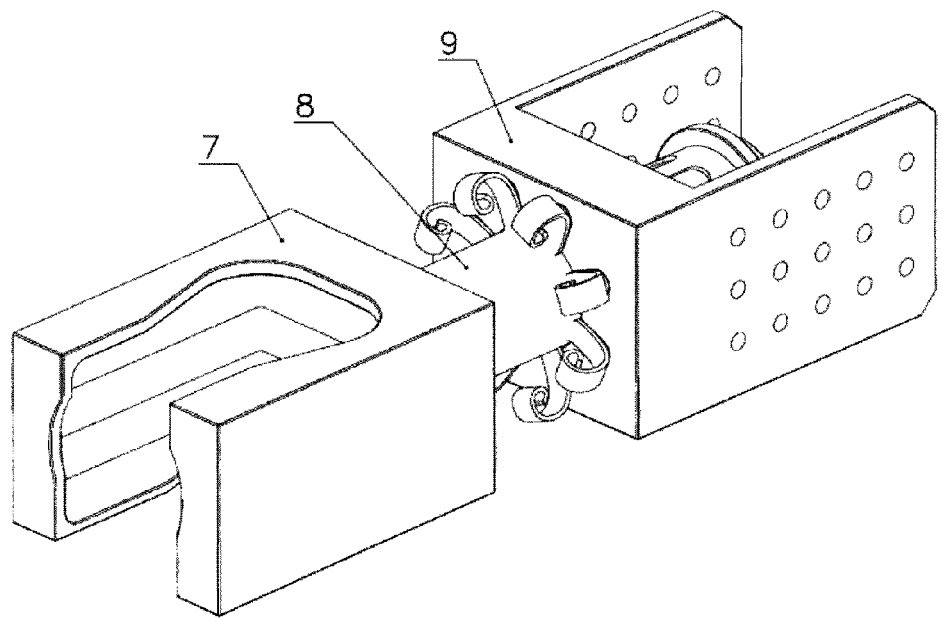

The operation of cutting the longitudinal grooves 27 on the surface of the bar 8 is illustrated more precisely in FIG. 13 which presents part of the coupler assembly according to the invention during the course of deformation in a perspective view.

Figure 14:
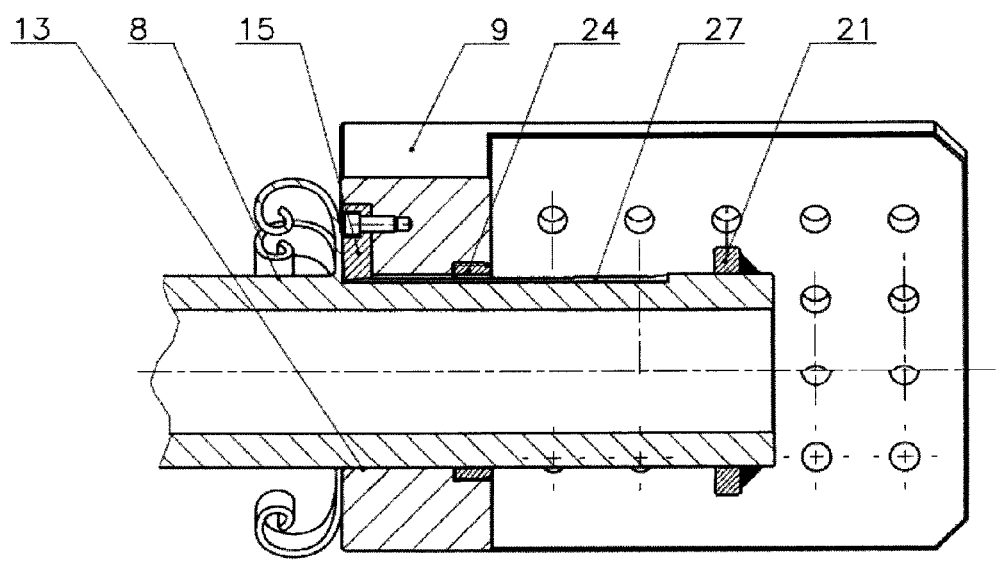

FIG. 14 shows a partial longitudinal section through the support bracket 9 and the bar 8 during the operation of the cutting of the longitudinal grooves 27. In order for the operation of the cutting of the longitudinal grooves 27 on the surface of the bar 8 to be able to commence, the collision force should exceed the tensile strength of the shear sleeve 20, shown in an unfailed state in FIG. 8, as a result of which the threaded part 24 of the shear sleeve 20 remains in the threaded undercut of the guiding aperture 13, and its severed second part, comprising the flange 21, remains on the bar 8.

Figure 15:
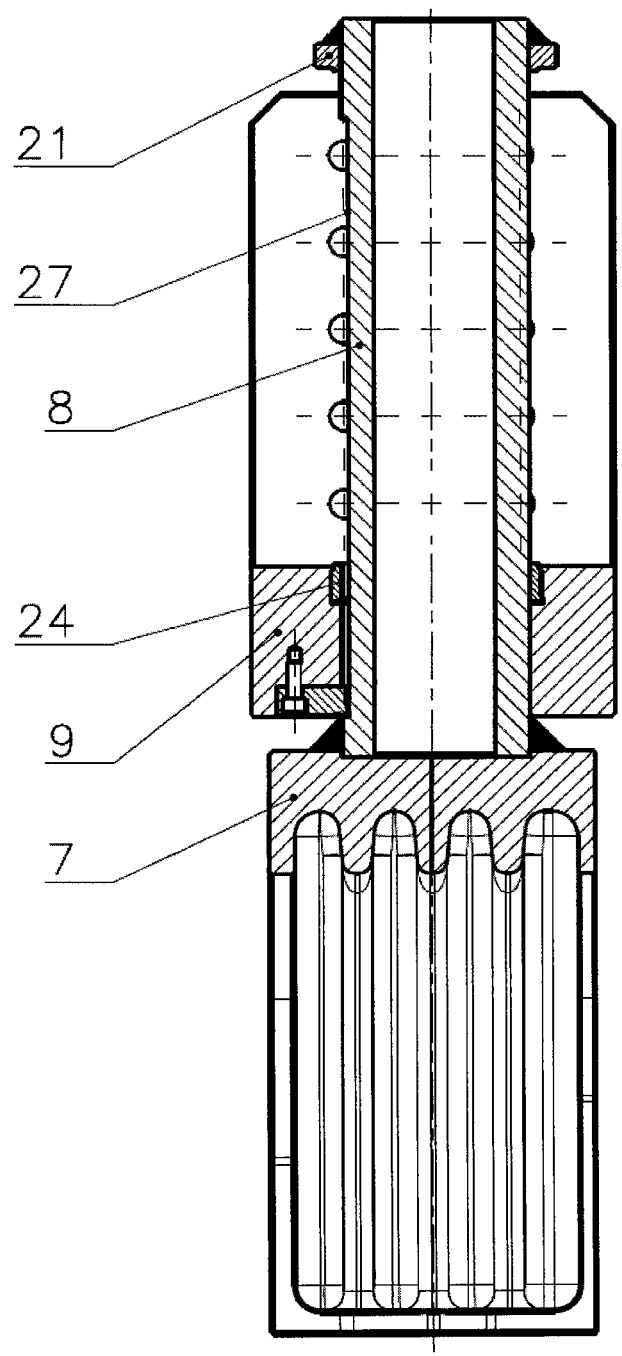
Figure 16:
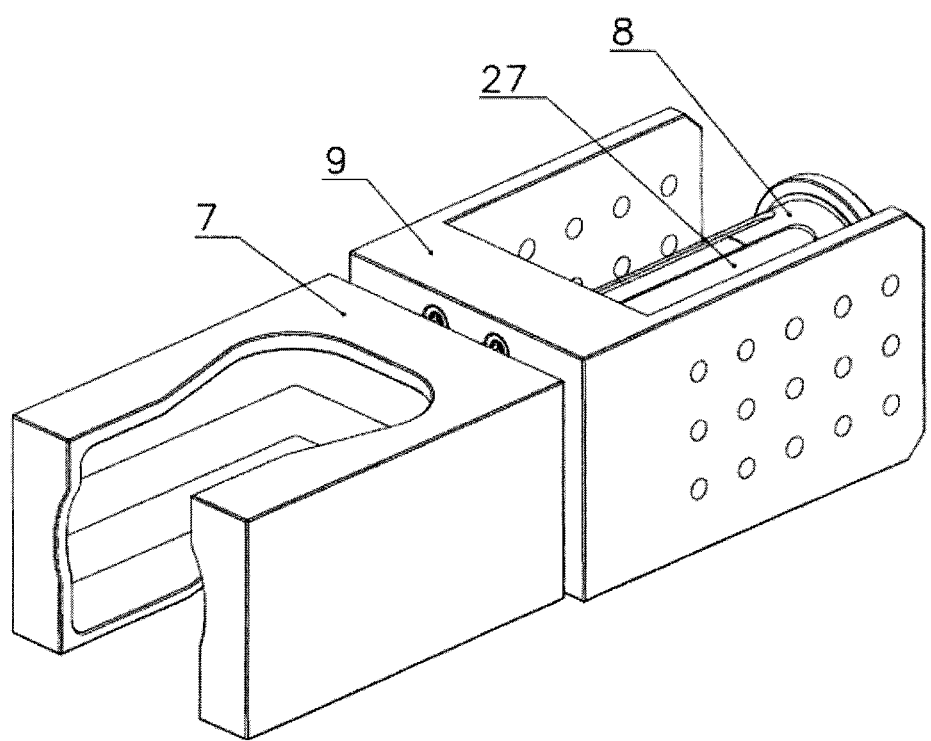
FIG. 16 shows the rear stop displaced in relation to the support bracket after total deformation on a perspective view.

The maximum displacement of the rear stop 7 in relation to the support bracket 9, after the whole work connected with the cutting of the grooves 27 on the bar 8 is performed, is presented in FIG. 15 in a cross-section, and the perspective view of this positioning of the rear stop 7 in relation to the support bracket 9 is presented in FIG. 16.

The invention claimed is:

1. A railway wagon coupler assembly with a pulling apparatus positioned between a front stop and a rear stop in a space between central girders of a railway wagon frame, having an energy absorbing unit positioned in the pulling apparatus, characterized in that the front stop is rigidly fixed to the central girders of the railway wagon frame, whereby the rear stop is mounted in a moving manner between the central girders of the wagon frame, and a support bracket, permanently fixed to the wagon frame, is positioned behind the rear stop, wherein an increased energy absorption unit is located in a space limited by the central girders, the support bracket and the rear stop, and the increased energy absorption unit comprises a bar fixed permanently to the rear stop and mounted in a moving manner in a guiding aperture made in a front wall of the support bracket, whereby machining knives are fixed on a circumference of the guiding aperture and wherein said machining knives comprise shank parts embedded in radial cut-outs made in the front wall of the support bracket.

2. The railway wagon coupler assembly according to claim 1, characterized in that the support bracket has side walls and a front wall of an increased thickness, perpendicular to the side walls, and the support bracket is fixed permanently to the central girders of the wagon frame.

3. The railway wagon coupler assembly according to claim 2, characterized in that the support bracket is fixed permanently to the central girders via a riveted, screw or welded connection.

4. The railway wagon coupler assembly according to claim 1, characterized in that cutting blades are positioned in guiding grooves of a limited length made on a surface of the bar.

5. The railway wagon coupler assembly according to claim 4, characterized in that the bar has the form of a sleeve.

6. The railway wagon coupler assembly according to claim 1, characterized in that the bar is secured against displacement in the guiding aperture up to a specified limit force.

7. The railway wagon coupler assembly according to claim 6, characterized in that securing of the bar against displacement in the guiding aperture is achieved by a shear sleeve, one part of which is connected to the support bracket, and the other part is connected to the bar.

8. The railway wagon coupler assembly according to claim 6, characterized in that securing of the bar against displacement in the guiding aperture is achieved by at least one shear pin embedded in the support bracket and in the bar.

9. The railway wagon coupler assembly according to claim 6, characterized in that securing of the bar against displacement in the guiding aperture is achieved by a resistance protrusion on the bar in front of a cutting blade of the machining knife.

10. A railway wagon coupler assembly with a pulling apparatus positioned between a front stop and a rear stop in a space between central girders of a railway wagon frame, having an energy absorbing unit positioned in the pulling apparatus, characterized in that the front stop is rigidly fixed to the central girders of the railway wagon frame, whereby the rear stop is mounted in a moving manner between the central girders of the wagon frame, and a support bracket, permanently fixed to the wagon frame, is positioned behind the rear stop, wherein an increased energy absorption unit is located in a space limited by the central girders, the support bracket and the rear stop, and the increased energy absorption unit comprises a bar fixed permanently to the rear stop and mounted in a moving manner in a guiding aperture made in a front wall of the support bracket, whereby machining knives are fixed on a circumference of the guiding aperture, wherein cutting blades are positioned in guiding grooves of a limited length made on a surface of the bar, and wherein shank parts of the machining knives are embedded in radial cut-outs made in the front wall of the support bracket.

11. The railway wagon coupler assembly according to claim 10, characterized in that the support bracket has side walls and a front wall of an increased thickness, perpendicular to the side walls, and the support bracket is fixed permanently to the central girders of the wagon frame.

12. The railway wagon coupler assembly according to claim 11, characterized in that the support bracket is fixed permanently to the central girders via a riveted, screw or welded connection.

13. The railway wagon coupler assembly according to claim 10, characterized in that the bar has the form of a sleeve.

14. The railway wagon coupler assembly according to claim 10, characterized in that the bar is secured against displacement in the guiding aperture up to a specified limit force.

15. The railway wagon coupler assembly according to claim 14, characterized in that securing of the bar against displacement in the guiding aperture is achieved by a shear sleeve, one part of which is connected to the support bracket, and the other part is connected to the bar.

16. The railway wagon coupler assembly according to claim 14, characterized in that securing of the bar against displacement in the guiding aperture is achieved by at least one shear pin embedded in the support bracket and in the bar.

17. The railway wagon coupler assembly according to claim 14, characterized in that securing of the bar against displacement in the guiding aperture is achieved by a resistance protrusion on the bar in front of a cutting blade of the machining knife.

* * * * *